UNITED STATES PATENT OFFICE.

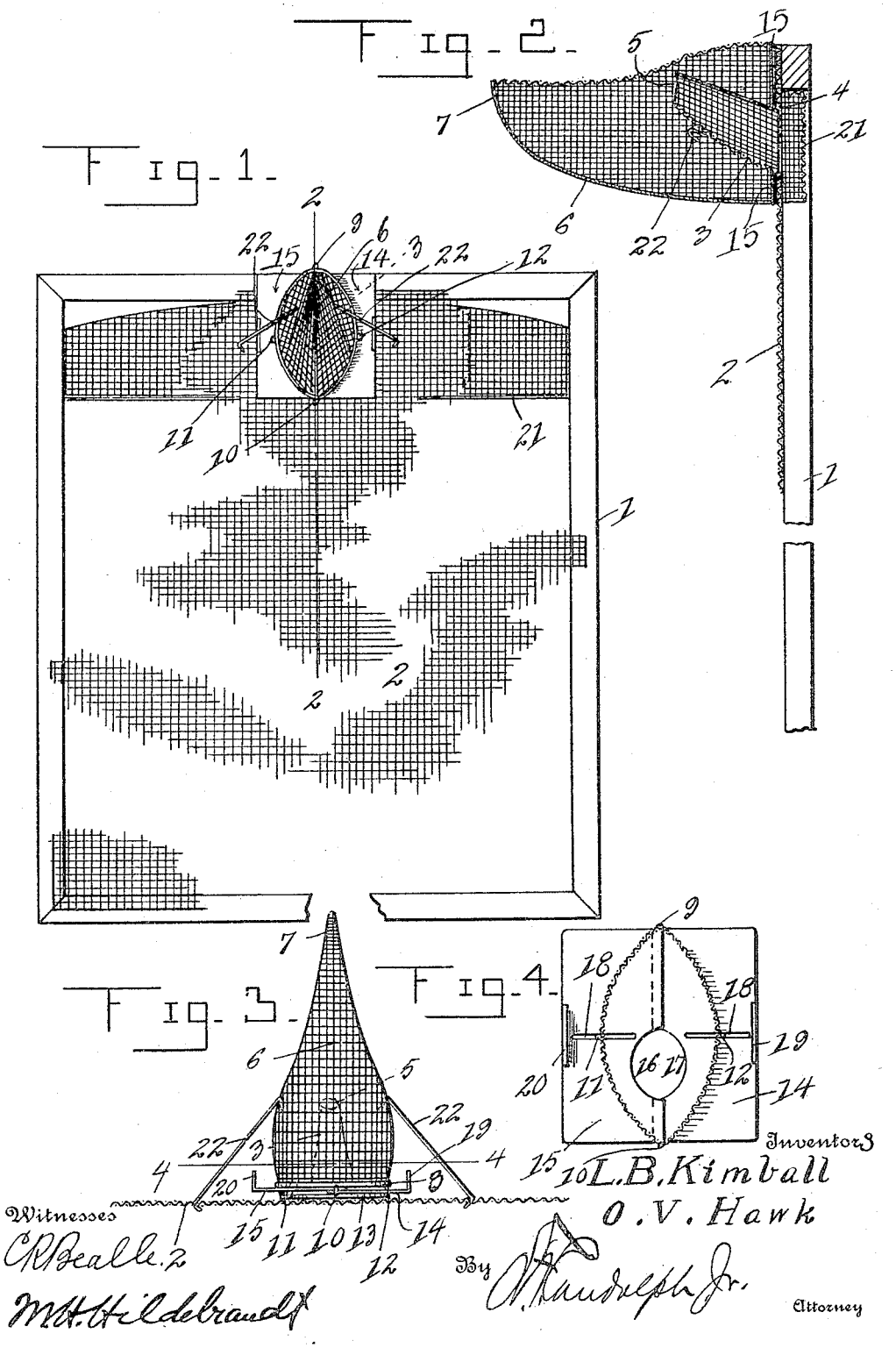
L. B. KIMBALL & O. V. HAWK.
FLY TRAP ATTACHMENT FOR SCREENS.
APPLICATION FILED MAY 14, 1913.
1,124,030.  Patented Jan. 5, 1915.

LEMUEL B. KIMBALL AND OLAND V. HAWK, OF ANTHONY, KANSAS.

FLY-TRAP ATTACHMENT FOR SCREENS.

1,124,030.  Specification of Letters Patent.  Patented Jan. 5, 1915.

Application filed May 14, 1913. Serial No. 767,618.

*To all whom it may concern:*

Be it known that we, LEMUEL B. KIMBALL and OLAND V. HAWK, citizens of the United States, residing at Anthony, in the county of Harper and State of Kansas, have invented certain new and useful Improvements in Fly-Trap Attachments for Screens; and we do hereby declare the following to be a full, clear, and exact description of the invention, such as will enable others skilled in the art to which it appertains to make and use the same.

This invention relates to new and useful improvements in fly escape devices for window screens, screen doors, and the like, and as its principal object contemplates the provision of an attachment of this character which will permit and encourage an easy exit of the flies, but which will prevent the entrance of the insects.

A further object resides in the provision of a trap cage employed in connection with the exit for confining the flies in a limited space.

A further object is to construct the trap cage in such manner that it may be removed from the screen without permitting the escape of any of the trapped flies, thus enabling the householder to apply a torch to the confined insects.

The above and additional objects are accomplished by such means as are illustrated in the accompanying drawings, described in the following specification, and then more particularly pointed out in the claims which are appended hereto and form a part of this application.

With reference to the drawings, wherein we have illustrated the preferred embodiment of our invention, as it is reduced to practice, and throughout the several views of which similar reference numerals designate corresponding parts: Figure 1 is a front elevation of a window screen equipped with the fly escape trap. Fig. 2 is a section on the line 2—2 of Fig. 1. Fig. 3 is a detail view illustrating the closure plates employed in connection with the trap cage. Fig. 4 is a section on the line 4—4 of Fig. 3.

Proceeding now to the description of the drawings, the numeral 1 designates the screen frame equipped with the customary wire gauze, or other suitable foraminous covering 2. At the upper end of the screen and spaced a slight distance from the upper horizontal frame member, is mounted an escape member 3, which is substantially funnel shaped, and is arranged with its longitudinal axis at an approximate angle of 45° to the plane of the screening 2. The funnel 3 registers with an opening formed in the screen 2, and may be attached by the simple method of weaving the free ends of the wire strands of the member 3 with the free ends of the strands of the member 2, as at 4, in Fig. 2. The upper terminal 5 of the member 3 is of less diameter than the opening at the base portion of the funnel, and is preferably formed with the free ends of the wire strands of the screening, from which the member 3 is made, slightly distorted, and bent in different directions. The obvious purpose of this roughening of the upper terminal of the member 3 is to prevent the reëntrance of the flies into the member 3 after they have passed into the trap cage. This trap cage 6 may be made of any suitable and desired shape, although the preferred embodiment of this invention employs a substantially conical conformation. The member 6 is also formed of wire gauze and is sealed at its outer terminal 7. The base terminal of the member 6 is provided with a bound edge, which may be produced by employing a channel-shaped binding band 8, which may be formed of tin, or any other suitable material. Spaced from the member 8, and held in fixed relation thereto by pairs of diametrically opposed depending spacing pins 9 and 10, 11 and 12, is a wire ring 13, which, in the assembled position of the member 6, bears against the face of the screen 2. As illustrated in Fig. 2, the member 6, when in assembled position, incases the member 3 so that all insects passing through the member 3 will be confined within the cage 6. Therefore, as a means for permitting the cage to be removed from the screen without allowing the escape of the insects, there has been provided a pair of closure plates 14 and 15, designed to be slidably mounted between the members 8 and 13, as illustrated in detail in Figs. 3 and 4. The plates are formed with registering semicircular cut-away portions indicated at 16 and 17, which, in the assembled position of the plates, encircle the base portion of the member 3. Each plate is provided with a laterally extending elongated slot 18 in which are arranged the members 11 and 12, as will be observed by reference to Fig. 4. A pair of upwardly turned finger grips 19 and 20 are respectively formed in the outer longitudinal edges of the members 14 and 15, for the obvious purpose of enabling the operator to manipulate the plates during the removal of the member 6.

In order to encourage the exit of the flies, or other insects, crawling on the inner face of the screen 2, this invention employs a wire gauze apron 21, which may be tacked, or otherwise secured at its upper longitudinal edge, to the terminals of the frame members of the screen. It will be seen that by arranging the apron 21 at the upper portion of the screen and in spaced relation to the exit opening, that as the flies crawl up the screen, they will find themselves confined between the member 21 and the screen, the only exit presented being through the funnel 3. It is natural to presume that the insects will pursue their way through the member 3 and enter into the cage 6. When a number of flies or other insects have passed into the cage 6 in the manner above described, the cage may be removed, and the flies immersed in a bucket of water, or killed by the application of a torch.

The manipulation of the closure plates during the removal of the cage 6 is briefly as follows: The wire stays 22 and 23, by which the member 6 is held to the screen, are removed, and the finger grips 19 and 20 are grasped in the usual manner. The member 6 is then drawn away from the screen 2, and as the plates 14 and 15 approach the upper reduced terminal of the member 3, they are continuously forced toward the center of the member 6, the plate 15 sliding over the plate 14 during this movement. It will be apparent that as the plates approach the upper terminal of the member 3, the registering cut-away portions 16 and 17 will continue to encircle the member 3, and that when the plates have been drawn beyond the terminal 5 of the funnel 3, the further inward movement of the plate will produce a sufficient overlapping to seal the cut-away portions, thus effectively closing the funnel 6, and preventing the escape of any insects.

It will be observed that the members 9 and 10 are disposed exteriorly of the plates 14 and 15, and operate to prevent the displacement of the plate members.

In reduction to practice, we have found that the form of our invention, illustrated in the drawings, and referred to in the above description as the preferred embodiment, is the most efficient and practical; yet, realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claims.

What is claimed is:

1. The combination with a window screen or like structure, of a removable foraminous fly-trap cage attachment, including an escape funnel, a foraminous guide apron mounted in spaced relation to the outer terminal thereof, and said foraminous trap cage detachably secured to said screen and arranged to incase said funnel when in assembled position, said cage including a substantially funnel-shaped body member having its larger end open, a wire ring secured to the lower edge of the said body member and spaced therefrom, a pair of slidably mounted closure plates arranged for sliding movement between the said ring and bottom edge of the funnel, said closure plates being provided with registering semicircular cut-away portions adapted to encircle the said escape funnel when in assembled position, said plates being further adapted to slide one over the other when the cage is withdrawn from the screen to seal the said cut-away portions.

2. The combination with a window screen or like structure of an escape funnel secured at its larger end to said screen, a foraminous guide apron mounted in spaced relation to the outer terminal of said escape funnel, a foraminous trap cage detachably secured to said screen and arranged to incase said funnel when in assembled position, said cage including a substantially funnel shaped body member having its larger end open, pins carried by the larger end of said cage, a wire ring mounted upon said pins and spaced from said trap cage, a pair of closure plates having registering semi-circle cut out portions and slots formed therein, said pins extending through said slots, said cut-away portions adapted to encircle the escape funnel when in assembled position and said plates being further adapted to slide over one another when the cage is withdrawn from the screen to seal said cut-away portions and prevent the escape of the insects from said cage.

In testimony whereof we affix our signatures in presence of two witnesses.

LEMUEL B. KIMBALL.
OLAN V. HAWK.

Witnesses:
 VILONA CUTLER,
 C. D. CUTLER.

Copies of this patent may be obtained for five cents each, by addressing the "Commissioner of Patents. Washington, D. C."